(12) United States Patent
Burke et al.

(10) Patent No.: US 8,064,085 B2
(45) Date of Patent: Nov. 22, 2011

(54) SYSTEM AND METHOD OF PROCESSING PRINT ORDER REQUESTS

(75) Inventors: David Burke, Dublin (IE); Brian Deane, Dublin (IE); Paul McDonnell, Dublin (IE); Dermot Heslin, Dublin (IE)

(73) Assignee: BDDP International Limited, Dublin (IE)

( * ) Notice: Subject to any disclaimer, the term of this patent is extended or adjusted under 35 U.S.C. 154(b) by 749 days.

(21) Appl. No.: 12/221,813

(22) Filed: Aug. 7, 2008

(65) Prior Publication Data

US 2009/0040554 A1 Feb. 12, 2009

(30) Foreign Application Priority Data

Aug. 7, 2007 (IE) .................................... 2007/0560

(51) Int. Cl.
*G06F 3/12* (2006.01)
*H04N 1/32* (2006.01)
(52) U.S. Cl. ...................................... 358/1.15; 358/468
(58) Field of Classification Search .................. 358/1.15, 358/400, 401, 407, 405, 408, 468; 379/100.01, 379/100.09
See application file for complete search history.

(56) References Cited

U.S. PATENT DOCUMENTS

| | | | |
|---|---|---|---|
| 5,580,177 A * | 12/1996 | Gase et al. | 400/61 |
| 7,027,175 B2 | 4/2006 | Robertson | |
| 7,239,408 B1 * | 7/2007 | Whitmarsh et al. | 358/1.15 |
| 2001/0021311 A1 | 9/2001 | Mizumo | |
| 2004/0039647 A1 | 2/2004 | Roche | |

FOREIGN PATENT DOCUMENTS

EP 1 197 841 A3 4/2002

* cited by examiner

*Primary Examiner* — Jerome Grant, II
(74) *Attorney, Agent, or Firm* — Valauskas Corder LLC

(57) ABSTRACT

This invention relates to a system and method of processing print order requests in a print system comprising a central print controller, a plurality of remote print customers and a plurality of remote print suppliers, the central print controller being connected to the plurality of remote print customers and the plurality of remote print suppliers by way of a communications network. Print customers transmit their print order requests to one central print controller. The central print controller will have information relating to a number of print suppliers stored in the central print controller database and can ascertain which of the print suppliers is the most suitable print supplier for executing a particular order. The central print controller is able to obtain the different protocols and data formats used in the proprietary database systems of the print supplier from its own central print controller database and may then format the print order request into a format suitable for receipt by the print supplier.

20 Claims, 1 Drawing Sheet

SYSTEM AND METHOD OF PROCESSING PRINT ORDER REQUESTS

This application claims the benefit of Irish Patent Application No. 2007/0560 filed Aug. 7, 2007.

FIELD OF THE INVENTION

This invention relates to a system and method of processing print order requests in a print system comprising a central print controller, a plurality of remote print customers and a plurality of remote print suppliers, the central print controller being connected to the plurality of remote print customers and the plurality of remote print suppliers by way of a communications network.

BACKGROUND OF THE INVENTION

When undertaking any substantial print order request, such as the printing of business cards for all the partners of a particular firm, or printing leaflets for a promotional campaign run by a fast food restaurant chain, or indeed the printing of training manuals for a large number of employees, one of the most important aspects is sourcing a suitable printer, otherwise known as a print supplier, to carry out the print order request. It is imperative that a reputable print supplier is employed to undertake the print order request within the desired specifications of the print customer. Although integral to the fulfillment of any print order request, this is also seen as an extremely time consuming and laborious task to carry out. Very often, with limited budgets available, it is imperative to obtain the best value for the print customer whilst at the same time ensuring that the content of the print order request arrives in a timely manner. In other circumstances it may be imperative that the print order request is received as a matter of urgency and cost is a less important factor. In order to choose the most appropriate print supplier, the print customer must contact numerous print suppliers to compare and contrast the service levels, capacity, capability and pricing structures of each of the print suppliers before making a choice of print supplier to carry out a particular job.

In many cases, print customers develop a pool of reliable print suppliers that are able to carry out their printing requirements for them. However this is not always satisfactory as in many instances the print customers will have a print order request which has not been fulfilled by a particular print supplier previously and may not be within the suite of services provided by that particular print supplier. In these circumstances significant time may be lost by the print customer in transmitting an order to their print supplier only to find that the print supplier cannot successfully complete the order in the time frame provided or in certain circumstances would not be able to provide the service at all. The print customer must then look to other print suppliers to complete the job. In certain circumstances the print supplier may be able to carry out the job but it may be beyond their normal capacity and therefore they would be unable to carry out the job within the specified time limit. The selection of a suitable print supplier therefore becomes an iterative process which can waste valuable time and resources of the print customer.

Various methods and systems have been proposed to facilitate fulfillment of printing requirements. One such method and system is that described in European Patent Application EP 1,197,841 in the name of Hewlett-Packard Company. EP1,197,841 describes a method and system of brokering print services over the internet. The method provides a print brokering system that unites customers having specific printing needs with print providers that can fulfill those printing needs. Data files of the print job are stored in a print brokering system controller for subsequent downloading to a print provider. The data files are downloaded to the print provider once a print provider has been selected from a list of print providers by the customer.

US2004/0039647, in the name of Roche, describes an online marketplace for print services that attempts to balance the interests of a plurality of users of print services with the interests of a plurality of print service providers. Print orders are placed through the internet and are routed through a print merchant. U.S. Pat. No. 7,027,175, in the name of Hewlett-Packard Development Company, L.P., relates to a method and system in which the reprocessing of print orders is simplified. The method allows for print orders to be periodically reviewed and reprocessed at the request of the customer.

Although very useful, there is a need for a method and system that simplifies the process for the customer. It is an object therefore of the present invention to overcome at least some of these problems and provide a method of processing print order requests in a print system as well as a system for processing those print order requests that is efficient and simple to operate to satisfy print order requests in accordance with the requirements of print customers.

SUMMARY OF THE INVENTION

According to the invention there is provided a method of processing print order requests in a print system comprising a central print controller, a plurality of remote print customers and a plurality of remote print suppliers, the central print controller being connected to the plurality of remote print customers and the plurality of remote print suppliers by way of a communications network, the central print controller having a central processor and a central print controller database with service parameter data relating to each of the print suppliers stored thereon, the service parameter data including one or more of the print supplier location, the print supplier turnaround time, the print supplier capacity, the print supplier capability, the print supplier stock list and the print supplier work schedule, the central print controller database further having data relating to proprietary database systems in operation on each of the individual print suppliers connected to the central print controller stored thereon, the method comprising the steps of:

at least one of the remote print customers transmitting a print order request to the central print controller over the communications network, the print order request containing print criteria including details relating to the print customer and details relating to the content to be printed, the details relating to the print customer including one or more of the print customers billing address, the print order shipment address, the print customers contact details and the print customers order reference, the details relating to the content to be printed including one or more of the quantity of items to be printed, the required delivery date of the content and one or more identifiers of the content to be printed;

on receipt of the print order request from the remote print customer, the central print controller retrieving the service parameter data from the central print controller database and, using the central processor, comparing the print criteria of the print order request with the service parameter data of each of the print suppliers and thereafter the central print controller matching the print order request to the print supplier that best matches the criteria of the print order request and selecting that print supplier for fulfillment of the print order;

subsequent to selection of the appropriate print supplier, the central print controller retrieving the data relating to the proprietary database system in operation on the selected print supplier from the central print controller database;

the central print controller reconfiguring the print order request received from the print customer in the central processor into a format suitable for transmission to the proprietary database system of the appropriately selected print supplier over the communications network in accordance with the proprietary database system that is in operation on the selected print supplier and thereafter transmitting the reconfigured print order request to the selected print supplier over the communications network;

the print supplier thereafter receiving the reconfigured print order request and populating the print suppliers proprietary database system with the print order request thereby scheduling the print order for execution and thereafter printing the content of the print order request in accordance with the print order criteria, packing the content of the print order request and shipping the print order content to the print customer; and at a predetermined interval, the print supplier transmitting specific print order request information to the central print controller relating to the completion of the print order request and the central print controller transmitting specific print order request information to the print customer in connection with handling the print order request.

This is seen as a particularly useful method of processing print order requests as print customers are able to transmit their print order requests to the one central print controller. The central print controller has the information relating to a number of print suppliers stored in the central print controller database. The central print controller can ascertain which of the print suppliers is the most suitable print supplier for executing a particular order. This significantly reduces the time and effort expended by a print customer in obtaining a suitable print supplier for their print order request. The print customer would no longer have to trawl through countless different print suppliers obtaining quotations from each of the individual print suppliers and comparing them before selecting a suitable supplier. Therefore the best value for the print customer is achieved in the shortest time possible.

For example, a print order request may come in from a fast food chain (print customer) requiring 100,000 leaflets to be provided in time for a new kid's menu promotion. This may be in response to a new toy craze or film release and must be done within 5 days. The print customer does not have to spend valuable time and resources sourcing the individual print supplier themselves but instead transmits the order to the central print controller. The central print controller can then ascertain from the print order criteria which of the print suppliers most suitably matches the print order criteria. In this instance there may be only three printer suppliers who are able to turn out over 100,000 leaflets within 5 days. The central print controller can then narrow down the print order request to these three potential print suppliers. The central print controller can then ascertain, based on the print order request, which of the three print suppliers is the most suitable by determining that one of the print suppliers is in Asia whereas the other two are in the European zone. If the print customer is also in the European zone it may be decided that it would be possible to provide the order with reduced shipping costs by employing one of the print suppliers in the European zone.

Finally, it may come down to a matter of price between the individual print suppliers. In this way, the central print controller can determine the best print supplier to execute a particular print order request. Upon selecting that print supplier, the central print controller takes the content of the print order and reconfigures that content into a format suitable for transmission to the print supplier. The central print controller is able to obtain the various different protocols and data formats used in the proprietary database systems of the print supplier from its own central print controller database and may then format the print order request into a format suitable for receipt by the print supplier. Once in a suitable format the central print controller is able to transmit the print order request to the print supplier who may in turn populate their proprietary database system directly with the print order request and fulfill the order in accordance with the print order criteria. The print order request may be printed, packaged and shipped to the print customer without any further interaction by the print customer.

In one embodiment of the invention there is provided a method of processing print order requests in which the step of the central print controller comparing the print criteria of the print order request with the service parameter data of each of the print suppliers in the central processor and matching the print order request to the print supplier that best matches the criteria of the print order request further comprises the central print controller selecting the print supplier based on, in a predetermined order of importance, the print criteria matching:

(a) the print supplier capability;
(b) the print supplier location;
(c) the print supplier turnaround time;
(d) the print supplier capacity;
(e) the print supplier stock list; and
(f) the print supplier work schedule.

This is seen as important as different weightings may be given to different factors. First of all, the central print controller may decide that the most important factor would be the print supplier capability or in other words, that the print supplier is capable of printing colour brochures (if that is what the job requires). Secondly the central print controller can determine from the print order request that it is imperative that the job may be turned around within 5 working days for subsequent distribution by the print customer or a third party. Accordingly, the next most important weighting may be on the turnaround time of the print supplier. Furthermore, additional weightings may be given to the price or the print supplier location or indeed the print supplier capacity to ensure that the job can be done within a certain time frame or delivered in the least expensive manner possible.

In one embodiment of the invention there is provided a method of processing print order requests in which the method further comprises the step of the print customer specifying the order of importance of the service parameter data and determining how the order is to be handled in accordance with those criteria.

This is seen as useful as the print customer themselves may specify the most important criteria to them and therefore the print supplier who can satisfy these criteria most relevant to the print customer will be selected accordingly.

In one embodiment of the invention there is provided a method of processing print order requests in which the step of reconfiguring the print order requests in the central processor into a format suitable for submission to the appropriately selected print supplier comprises generating at least one print ready file containing the content to be printed and at least one print report detailing the content of the print ready file including an inventory of the print ready file.

In one embodiment of the invention there is provided a method of processing print order requests in which the print ready files are loaded directly into a print suppliers print queue in the print supplier proprietary database system in accordance with a predetermined set of criteria and the method comprises the additional step of alerting the print supplier to the new print ready files in their print queue.

In one embodiment of the invention the method further comprises the step of the print supplier, on receiving a print order request, determining the content of the print order request to be printed and ascertaining whether there is content contained in the print order request in common with content of other print order requests in the print supplier print queue, and on the print supplier determining that there is content in common with content in other print order requests in the print queue, the print supplier rearranges the print queue by batching one or more print order requests in accordance with a predetermined set of criteria.

In this way, print order requests may be automatically inserted into the print queue of a print supplier for handling by that print supplier, the print supplier is alerted to the presence of the order in the queue in the usual manner. Any print order request that contains material common with other print order requests in the queue, as may be the case in the printing of training manuals or the like where there may be chapters in common such as first aid courses regardless of the end customer, these print order requests may be batched together and printed in the same print run in order to print the material in the most economical fashion possible.

In one embodiment of the invention, on the print supplier receiving a print order request from the central print controller, the print order request further comprises a shipment way bill complete with a tracking number for printing at the print supplier.

This is seen as particularly useful as by automatically generating a shipment way bill complete with a tracking number for the printing at the print supplier, it will be possible to avoid the need for further human interaction on the side of the print customer. The print jobs will be automatically inserted into the print queue of the print supplier in a format suitable for printing by the print supplier. In addition to this, the shipment way bill will be automatically provided thereby obviating any need for an employee of the print supplier to insert data into an additional shipment system. This obviates the possibility of any errors being created by the print suppliers' employees inserting an incorrect address into the shipment system as all the information has been provided by the print customer themselves. Therefore accountability for successful addressing of the print order request is on the part of the print customer themselves. This will further enhance the usefulness of the method and system as well as ensuring that orders may be fulfilled and transmitted to the correct recipients in accordance with the print customers' requests.

In one embodiment of the invention there is provided a method of processing print order requests in which the shipment way bill is printed as part of a print order content docket, the print order content docket comprising a two part docket, one part of which being the shipment way bill which is provided with an adhesive backing for removal from the print order content docket and subsequent attachment to a print order package, the other part of the print order content docket containing an itemized list of the content to be printed in the print order request.

This is seen as a particularly important part of the invention that allows successful completion and shipment of each of the print order requests to the print customers. By printing a two-part print order content docket a significant amount of paperwork may be avoided. Again, the minimum amount of interaction by the print supplier employees is necessary. The information provided by the print customer is transmitted via the central print controller to the print supplier. The way bill and the itemized list of content to be printed are transmitted to the print supplier directly and therefore the print supplier may check off this itemized list that the correct items are being shipped with that order. Furthermore, one piece of paper may be used to also provide the way bill which may be attached to the packaging once the items are ready for shipping. This cuts down on the employee interaction required as well as significantly cutting down on the amount of paperwork produced.

In one embodiment of the invention there is provided a method of managing print orders in which the step of the print supplier packing the content of the print order further comprises the step of the print supplier peeling the shipment way bill off the print order content docket and thereafter applying the shipment way bill to the exterior of the packaging in which the print order is to be shipped, and checking the content as it is packed into the packaging against the itemized list on the print order content docket.

By packing the content of the print order request in this manner significant time and effort would be saved by the print supplier as they do not have to provide their own shipment docket or indeed do not have to provide an itemized list themselves. This is automatically generated by the system once they receive the print order. Of course this information has also been provided by the print customer and modified in a format acceptable to the print supplier by the central print controller. This further enhances the probability of correct orders being sent to the correct customers in a timely fashion.

In one embodiment of the invention there is provided a method of processing print order requests in which the shipment way bill is transmitted to a logistics company by the central print controller along with a collection due date.

In one embodiment of the invention there is provided a method of processing print order requests in which all print order requests sent by a print customer for a predetermined billing period are grouped together and a billing charge is determined by the central print controller based on the content of the entire number of print order requests given by that print customer over that billing period.

The present invention and its attributes and advantages will be further understood and appreciated with reference to the detailed description below of presently contemplated embodiments, taken in conjunction with the accompanying drawings.

DETAILED DESCRIPTION OF EMBODIMENTS OF THE INVENTION

Figure 1:
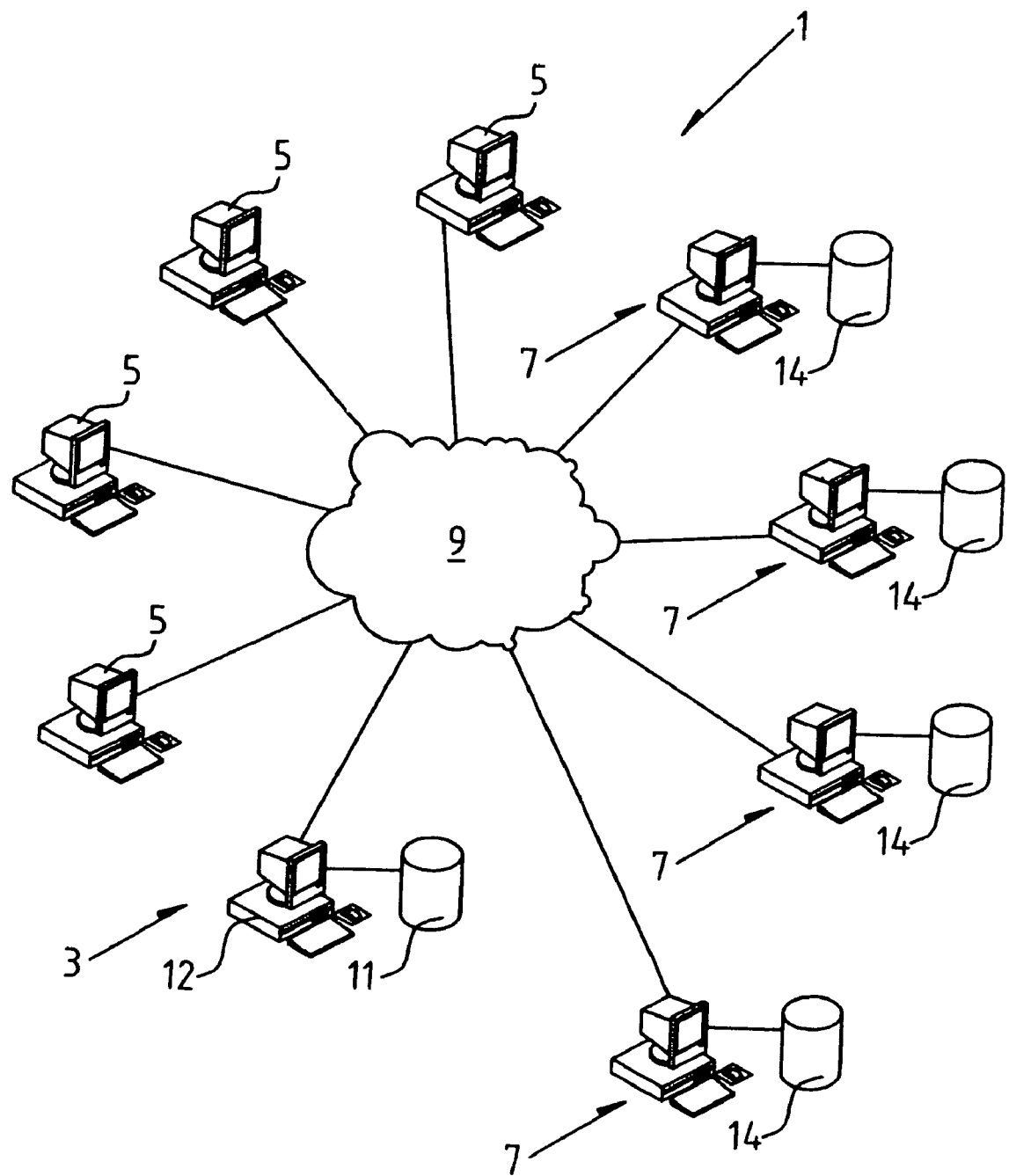
FIG. 1 is a diagrammatic view of a system in which the method according to the invention may be implemented.

Referring to the drawing there is shown a system indicated generally by the reference numeral 1 comprising a central print controller 3, a plurality of print customers 5 and a plurality of print suppliers 7, all connected by way of a communications network, in this instance, the internet 9. The central print controller 3 further comprises a central print controller database 11 having service parameter data relating to each of the print suppliers 7 stored thereon, the service parameter data including one or more of the print supplier location, the print supplier turnaround time, the print supplier capacity, the print supplier capability, the print supplier stock list and the print supplier work schedule. Each of the print suppliers 7 further comprises a proprietary database system 14. The central print controller further comprising a central processor 12. The central print controller database 11 further having data relating to each of the proprietary database systems 14 in operation on each of the individual print suppliers 7.

In use, one of the remote print customers 5 transmits a print order request (not shown) via the communications network 9 to the central print controller 3. The central print controller 3, on receiving the print order request retrieves service parameter data relating to each of the individual print suppliers 7 from central print controller database 11 and thereafter the central print controller matches the print order request to the print supplier that best matches the criteria of the print order request using the central processor 12. The central print controller 3 then selects the best suited print supplier 7 for the job and retrieves data relating to any proprietary database system 14 in operation on the selected print supplier from central print controller database 11. The central print controller then reconfigures the print order request received from the print customer into a format suitable for transmission to the chosen print supplier and thereafter transmits the reconfigured print order request to the selected print supplier 7 over the communications network 9. On receipt of the print order request, the print supplier populates their proprietary database system (not shown) with the print order request thereby scheduling the print order request for execution and subsequently prints the content of the print order request in accordance with the print order criteria. The content of the print order request is then packed and shipped to the print customer directly. The print supplier, at a predetermined interval, transmits specific print order request information to the central print controller relating to the completion of the print order request and the central print controller transmits specific print order request information to the print customer.

The print supplier service parameter data includes the print supplier capability, the print supplier location, the print supplier turnaround time, the print supplier capacity, the print supplier stock list and the print supplier work schedule. The print supplier capability relates to the ability of the print supplier to provide certain materials. For instance, whether the print supplier is able to provide large scale colour printing pamphlets, hologrammatic imaging, hardback binding and the like. The print supplier location relates to the geographic location of a print supplier and may be important when considering the shipment times required to transmit an order to a print customer. The print supplier turnaround time is set by each individual print supplier that they will guarantee that any print order request received of a particular size will be printed and sent out within a print order request turnaround time. Usually this is calculated in a number of days and is important so that the system can determine that a print order request can be printed and transmitted within a suitable time frame. The print supplier pricing structure may also be provided and shows the individual pricing lists for different jobs and may vary from supplier to supplier depending on the size of the job, the type of job i.e. colour, black and white, colour paper, paper weight and the like. This is important to allow the system to obtain the best value for the print customers.

The print supplier capacity relates to the maximum size of order that may be handled by a print supplier within their print supplier turnaround time. For example, a print supplier may determine that it is only possibly to run their printing presses at maximum capacity for 20 hours a day which would allow them print 200,000 leaflets a day therefore, it is important to know the capacity of each individual print supplier so that this is not exceeded by any individual order and if so a flag may be sent to the system that a particular print order turnaround time is no longer applicable. The print supplier's stock list allows the central print controller to determine whether stock items such as small card used in the production of business cards are available or a particular colour or weight of paper is available as these may effect the turnaround time as well as the capability to carry out a print order request by any chosen supplier. Finally, the print supplier work schedule is useful as it is possible to determine whether a particular print supplier has exceeded its capacity or is likely to exceed its capacity based on receiving an additional print order request and if so the implications for that print order request and whether it is more suitable to send it to an otherwise less desirable print supplier to ensure that the print order request is fulfilled according to the set criteria.

It is envisaged that the print customer may specify the order of importance of the service parameter data and therefore determine how the print order request is to be handled in accordance with those criteria. For instance, it may be the normal scenario that price is the most important factor for a particular company when placing their print order requests and they wish to receive the lowest cost material possible. This company may not be particularly concerned with the speed in which it receives the print order requests as long as they are relatively inexpensive. This is particularly the case if an order is being made several months in advance of the due date such as headed note paper for a large corporation where there are sufficient stocks in reserve to tie the corporation over until the print order request material arrives. In other circumstances it may be necessary to obtain the material in a very short space of time with cost as a less important criterion. For instance, if a new employee is introduced into the company, for example a sales man, it may be imperative to obtain business cards for that sales man in a short space of time so that the sales man may get to work as soon as possible without delay. In this instance the print customer may specify that turnaround time is of utmost importance in the service parameter data.

The central print controller, when reconfiguring a print order request for the chosen print supplier, generates a print ready file containing the content to be printed as well as a print report detailing the content of the print ready file including an inventory of the print ready file. In this way, the print supplier is able to check that all the materials in the print order request have been properly accounted for and have been printed. Furthermore, it is possible to separate the actual content to be printed itself from the documentation required for administrative purposes such as the mailing address for the print order request. The print ready file may be provided in a standard format such as in a Microsoft Publisher® type file whereas the delivery information may be in a separate file which is suitable for integration into an existing proprietary database system of the print supplier such as in an XML message, comma separated file or other format suitable for integration into the proprietary database system. This ensures that all the information may be integrated into the proprietary database system in a seamless manner.

Each of the print ready files is loaded directly into the print supplier's print queue and the print supplier is alerted to the new print ready files in the print queue. Once the print ready file has been inserted into the print queue of the supplier it is possible to determine whether that print order request may be batched with other print order requests in the print queue in order to provide the most efficient printing for the print supplier. For instance, in the circumstance where they are printing a number of training manuals for Company "A", they may also receive an order to print training manuals for Company "B". Both of these training manuals may contain a first aid section and a section relating to proper behaviour in the workplace that are identical to each other. In this circumstance, it may be possible to batch the two print order requests together so that the pair of common sections may be printed in the same print run thereby providing a more economic solution for the print supplier themselves by printing the material in a longer print run. This is made possible by having the print order request separated into a print ready file and print report as the items of each print order request are carefully documented and identified and may be clearly combined together.

One further particularly attractive aspect of the present invention is the fact that the print order request may contain the way bill for a shipment company including tracking number already inserted thereon. This way, the central print controller may be able to provide the tracking number to the customer as well as a tracking number to the print supplier that all three parties are able to use for traceability and accountability. The customer may view the progress of their print order request as it is being handled by the print supplier and may check that everything is on course. Furthermore, the print customer can see when their print order request is ready for shipment and when it is being shipped.

The tracking number and way bill are preferably sent as part of the print order content docket which includes an itemized list of contents to be packed. This print order content docket is transmitted to the print supplier along with the print order requests as part of the print order request. The print order content docket is printed out by the print supplier so that the items of the print order request may be checked as they are being packaged against the itemized list of the print order content docket. As soon as all the contents have been confirmed and packed away in the suitable packaging, the way bill which is provided with an adhesive backing is separated off the print order content docket and affixed to the outside of the packaging. In this way, there is no human interaction required for inserting information into proprietary systems in the print supplier thereby reducing the man hours required, streamlining their systems and avoiding the possibility of any mistakes being made in transcription. Essentially therefore the customer themselves is providing their own billing address and shipment documentation by producing the print order request in the first place. The shipment way bill tracking number may be transmitted to a logistics company by the central print controller along with the collection due date. Again, no further insertion of data is required into a proprietary system and this is carried out in a seamless manner.

In order to avoid any confusion, this invention relates solely to the field of large scale printing or so-called industrial printing of items such as leaflets, pamphlets, business cards, periodicals and the like and does not in any way concern printing carried out in small scale computer networks such as those found in a typical office or small business environment. Any reference to a remote print supplier is not intended to include individual printing machines such as those found in an office environment but in fact relates to large scale industrial printing companies that are in the business of providing print media to their customers. Similarly, the central print controller is not to be seen simply as a network hub or other device in a small scale office environment but is limited to an intermediary between large scale printing outfits and their print customers.

According to the present invention, the central print controller matches the print order request to the print supplier with service parameter data that best matches the criteria of the print order request and selects that print supplier for fulfillment of the print order. By best match, what is meant is the service parameter data that most closely matches the requirements of the customer as specified in the print order request. For example, they may request that the most important aspect is that the order is fulfilled within ten working days and as a secondary requirement that the total cost of the order including shipping is less than $100. A first provider may be able to supply the order within ten working days but the cost would be $120 whereas a second provider may be able to supply the order in twelve working days but for $90. The system ascertains that the most important criteria is that the order is received within ten days rather than the cost being below $100 and therefore chooses the first provider to fulfill the order. Similarly, other more complex rules could be applied as would be understood to the skilled addressee. For example, there may be numerous criteria and the provider that satisfies the most criteria can be chosen to fulfill the order. Weightings can be given to the criteria in their order of importance. Two criteria may of course be given the same weighting if desired. For example, the order must be delivered within ten days and the cost must be for under $100. Again, other more complex weighting models can be employed as desired.

In the specification the terms "comprise", "comprises", "comprised" and "comprising" and the terms "include", "includes", "included" and "including" are all deemed totally interchangeable and should be afforded the widest possible interpretation. The invention is in no way limited to the embodiments hereinbefore described but may be varied in both construction and detail within the scope of the claims.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A method of processing print order requests in a print system comprising a central print controller, a plurality of remote print customers and a plurality of remote print suppliers, the central print controller being connected to the plurality of remote print customers and the plurality of remote print suppliers by way of a communications network, the central print controller having a central processor and a central print controller database with service parameter data relating to each of the print suppliers stored thereon, the service parameter data including one or more of a print supplier location, a print supplier turnaround time, a print supplier capacity, a print supplier capability, a print supplier stock list and a print supplier work schedule, the central print controller database further having data relating to a proprietary database system in use by the print supplier for each of the print suppliers connected to the central print controller stored thereon, the method comprising the steps of:

at least one of the remote print customers transmitting a print order request to the central print controller over the communications network, the print order request containing print criteria including details relating to the print customer and details relating to content to be printed, the details relating to the print customer including one or more of a print customer billing address, a print order shipment address, a print customer contact details and a print customer order reference, the details relating to the content to be printed including one or more of a quantity of items to be printed, a required delivery date of the content and one or more identifiers of the content to be printed;

on receipt of the print order request from the remote print customer, the central print controller retrieving the service parameter data from the central print controller database and using the central processor, comparing the print criteria of the print order request with the service parameter data of each of the print suppliers and thereafter the central print controller matching the print order request to the print supplier with service parameter data that best matches the criteria of the print order request and selecting that print supplier for fulfillment of the print order;

subsequent to selection of the appropriate print supplier, the central print controller retrieving the data relating to the proprietary database system in operation on the selected print supplier from the central print controller database;

the central print controller reconfiguring the print order request received from the print customer in the central processor into a format suitable for transmission to the proprietary database system of the appropriately selected print supplier over the communications network in accordance with the proprietary database system that is in operation on the selected print supplier and thereafter transmitting the reconfigured print order request to the selected print supplier over the communications network;

the print supplier thereafter receiving the reconfigured print order request and populating the print suppliers proprietary database system with the print order request thereby scheduling the print order for execution and thereafter printing the content of the print order request in accordance with the print order criteria, packing the content of the print order request and shipping the print order content to the print customer; and at a predetermined interval, the print supplier transmitting specific print order request information to the central print controller relating to the completion of the print order request and the central print controller transmitting specific print order request information to the print customer in connection with handling the print order request.

2. The method of processing print order requests as claimed in claim 1 in which the step of the central print controller comparing the print criteria of the print order request with the service parameter data of each of the print suppliers in the central processor and matching the print order request to the print supplier that best matches the criteria of the print order request further comprises the central print controller selecting the print supplier based on, in a predetermined order of importance, the print criteria matching:

(a) the print supplier capability;
(b) the print supplier location;
(c) the print supplier turnaround time;
(d) the print supplier capacity;
(e) the print supplier stock list; and
(f) the print supplier work schedule.

3. The method of processing print order requests as claimed in claim 2 in which the method further comprises the step of the print customer specifying the order of importance of the service parameter data and determining how the order is to be handled in accordance with those criteria.

4. The method of processing print order requests as claimed in claim 1 in which the step of reconfiguring the print order requests in the central processor into a format suitable for submission to the appropriately selected print supplier comprises generating at least one print ready file containing the content to be printed and at least one print report detailing the content of the print ready file including an inventory of the print ready file.

5. The method of processing print order requests as claimed in claim 4 in which the print ready files are loaded directly into a print suppliers print queue in the print supplier proprietary database system in accordance with a predetermined set of criteria and the method comprises the additional step of alerting the print supplier to the new print ready files in their print queue.

6. The method of processing print order requests as claimed in claim 5 in which the method further comprises the step of the print supplier, on receiving a print order request, determining the content of the print order request to be printed and ascertaining whether there is content contained in the print order request in common with content of other print order requests in the print supplier print queue, and on the print supplier determining that there is content in common with content in other print order requests in the print queue, the print supplier rearranges the print queue by batching one or more print order requests in accordance with a predetermined set of criteria.

7. The method of processing print order requests as claimed in claim 1 in which on the print supplier receiving a print order request from the central print controller, the print order request further comprises a shipment way bill complete with a tracking number for printing at the print supplier.

8. The method of processing print order requests as claimed in claim 7 in which the shipment way bill is printed as part of a print order content docket, the print order content docket comprising a two part docket, one part of which being the shipment way bill which is provided with an adhesive backing for removal from the print order content docket and subsequent attachment to a print order package, the other part of the print order content docket containing an itemized list of the content to be printed in the print order request.

9. The method of processing print order requests as claimed in claim 8 in which the step of the print supplier packing the content of the print order requests further comprises the step of the print supplier peeling the shipment way bill off the print order content docket and thereafter applying the shipment way bill to the exterior of the packaging in which the print order is to be shipped, and checking the content as it is packed into the packaging against the itemized list on the print order content docket.

10. The method of processing print order requests as claimed in claim 7 in which the shipment way bill is transmitted to a logistics company by the central print controller along with a collection due date.

11. The method of processing print order requests as claimed in claim 1 in which all print order requests sent by a print customer for a predetermined billing period are grouped together and a billing charge is determined by the central print controller based on the content of the entire number of print order requests given by that print customer over that billing period.

12. A method of processing print order requests in a print system comprising a central print controller, a plurality of remote print customers and a plurality of remote print suppliers, the central print controller being connected to the plurality of remote print customers and the plurality of remote print suppliers by way of a communications network, the central print controller having a central processor and a central print controller database with service parameter data relating to each of the print suppliers' stored thereon, the service parameter data including one or more of a print supplier location, a print supplier turnaround time, a print supplier capacity, a print supplier capability, a print supplier stock list and a print supplier work schedule, the central print controller database further having data relating to a proprietary database system in use by the print supplier for each of the print suppliers connected to the central print controller stored thereon, the method comprising the steps of:

at least one of the remote print customers transmitting a print order request to the central print controller over the communications network, the print order request containing print criteria including details relating to the print customer and details relating to content to be printed, the details relating to the print customer including one or more of a print customer billing address, a print order shipment address, a print customer contact details and a print customer order reference, the details relating to the content to be printed including one or more of a quantity of items to be printed, a required delivery date of the content and one or more identifiers of the content to be printed;

on receipt of the print order request from the remote print customer, the central print controller retrieving the service parameter data from the central print controller database and using the central processor, comparing the print criteria of the print order request with the service parameter data of each of the print suppliers and thereafter the central print controller matching the print order request to the print supplier with service parameter data that best matches the criteria of the print order request and selecting that print supplier for fulfillment of the print order;

subsequent to selection of the appropriate print supplier, the central print controller retrieving the data relating to the proprietary database system in operation on the selected print supplier from the central print controller database;

the central print controller reconfiguring the print order request received from the print customer in the central processor into a format suitable for transmission to the proprietary database system of the appropriately selected print supplier over the communications network in accordance with the proprietary database system that is in operation on the selected print supplier;

the step of reconfiguring the print order requests in the central processor into a format suitable for submission to the appropriately selected print supplier comprises generating at least one print ready file containing the content to be printed and at least one print report detailing the content of the print ready file including an inventory of the print ready file;

transmitting the reconfigured print order request to the selected print supplier over the communications network;

the print supplier thereafter receiving the reconfigured print order request and populating the print suppliers proprietary database system with the print order request thereby scheduling the print order for execution, the print ready files are loaded directly into a print suppliers print queue in the print supplier proprietary database system in accordance with a predetermined set of criteria and alerting the print supplier to the new print ready files in their print queue;

the print supplier, on receiving the reconfigured print order request, determining the content of the print order request to be printed and ascertaining whether there is content contained in the print order request in common with content of other print order requests in the print supplier print queue, and on the print supplier determining that there is content in common with content in other print order requests in the print queue, the print supplier rearranges the print queue by batching one or more print order requests in accordance with a predetermined set of criteria;

printing the content of the print order request in accordance with the print order criteria, packing the content of the print order request and shipping the print order content to the print customer; and at a predetermined interval, the print supplier transmitting specific print order request information to the central print controller relating to the completion of the print order request and the central print controller transmitting specific print order request information to the print customer in connection with handling the print order request.

13. The method of processing print order requests as claimed in claim 12 in which the step of the central print controller comparing the print criteria of the print order request with the service parameter data of each of the print suppliers in the central processor and matching the print order request to the print supplier that best matches the criteria of the print order request further comprises the central print controller selecting the print supplier based on, in a predetermined order of importance, the print criteria matching:

(a) the print supplier capability;
(b) the print supplier location;
(c) the print supplier turnaround time;
(d) the print supplier capacity;
(e) the print supplier stock list; and
(f) the print supplier work schedule.

14. The method of processing print order requests as claimed in claim 13 in which the method further comprises the step of the print customer specifying the order of importance of the service parameter data and determining how the order is to be handled in accordance with those criteria.

15. The method of processing print order requests as claimed in claim 12 in which on the print supplier receiving a print order request from the central print controller, the print order request further comprises a shipment way bill complete with a tracking number for printing at the print supplier.

16. The method of processing print order requests as claimed in claim 15 in which the shipment way bill is printed as part of a print order content docket, the print order content docket comprising a two part docket, one part of which being the shipment way bill which is provided with an adhesive backing for removal from the print order content docket and subsequent attachment to a print order package, the other part of the print order content docket containing an itemized list of the content to be printed in the print order request.

17. The method of processing print order requests as claimed in claim 16 in which the step of the print supplier packing the content of the print order requests further comprises the step of the print supplier peeling the shipment way bill off the print order content docket and thereafter applying the shipment way bill to the exterior of the packaging in which the print order is to be shipped, and checking the content as it is packed into the packaging against the itemized list on the print order content docket.

18. A method of processing print order requests in a print system comprising a central print controller, a plurality of remote print customers and a plurality of remote print suppliers, the central print controller being connected to the plurality of remote print customers and the plurality of remote print suppliers by way of a communications network, the central print controller having a central processor and a central print controller database with service parameter data relating to each of the print suppliers stored thereon, the service parameter data including one or more of a print supplier location, a print supplier turnaround time, a print supplier capacity, a print supplier capability, a print supplier stock list and a print supplier work schedule, the central print controller database further having data relating to a proprietary database system in use by the print supplier for each of the print suppliers connected to the central print controller stored thereon, the method comprising the steps of:

- at least one of the remote print customers transmitting a print order request to the central print controller over the communications network, the print order request containing print criteria including details relating to the print customer and details relating to content to be printed, the details relating to the print customer including one or more of a print customer billing address, a print order shipment address, a print customer contact details and a print customer order reference, the details relating to the content to be printed including one or more of a quantity of items to be printed, a required delivery date of the content and one or more identifiers of the content to be printed;
- on receipt of the print order request from the remote print customer, the central print controller retrieving the service parameter data from the central print controller database and using the central processor, comparing the print criteria of the print order request with the service parameter data of each of the print suppliers and thereafter the central print controller matching the print order request to the print supplier with service parameter data that best matches the criteria of the print order request and selecting that print supplier for fulfillment of the print order;
- subsequent to selection of the appropriate print supplier, the central print controller retrieving the data relating to the proprietary database system in operation on the selected print supplier from the central print controller database;
- the central print controller reconfiguring the print order request received from the print customer in the central processor into a format suitable for transmission to the proprietary database system of the appropriately selected print supplier over the communications network in accordance with the proprietary database system that is in operation on the selected print supplier and thereafter transmitting the reconfigured print order request to the selected print supplier over the communications network;
- the print supplier thereafter receiving the reconfigured print order request and populating the print suppliers proprietary database system with the reconfigured print order request thereby scheduling the print order for execution and thereafter printing the content of the print order request in accordance with the print order criteria,
- the reconfigured print order request further comprises a shipment way bill complete with a tracking number for printing at the print supplier, and in which the shipment way bill is printed as part of a print order content docket, the print order content docket comprising a two part docket, one part of which being the shipment way bill which is provided with an adhesive backing for removal from the print order content docket and subsequent attachment to a print order package, the other part of the print order content docket containing an itemized list of the content to be printed in the print order request;
- packing the content of the print order request and shipping the print order content to the print customer; and
- at a predetermined interval, the print supplier transmitting specific print order request information to the central print controller relating to the completion of the print order request and the central print controller transmitting specific print order request information to the print customer in connection with handling the print order request.

19. The method of processing print order requests as claimed in claim 18 in which the step of the print supplier packing the content of the print order requests further comprises the step of the print supplier peeling the shipment way bill off the print order content docket and thereafter applying the shipment way bill to the exterior of the packaging in which the print order is to be shipped, and checking the content as it is packed into the packaging against the itemized list on the print order content docket.

20. The method of processing print order requests as claimed in claim 19 in which the shipment way bill is transmitted to a logistics company by the central print controller along with a collection due date.

\* \* \* \* \*